(12) United States Patent
Kurahashi

(10) Patent No.: US 10,944,878 B2
(45) Date of Patent: Mar. 9, 2021

(54) IMAGE READING APPARATUS AND IMAGE FORMING APPARATUS FOR WARNING OF RISK OF INFORMATION LEAKAGE

(71) Applicant: KYOCERA Document Solutions Inc., Osaka (JP)

(72) Inventor: Taro Kurahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/747,983

(22) Filed: Jan. 21, 2020

(65) Prior Publication Data

US 2020/0244822 A1 Jul. 30, 2020

(30) Foreign Application Priority Data

Jan. 28, 2019 (JP) .............................. JP2019-012335

(51) Int. Cl.
*H04N 1/00* (2006.01)

(52) U.S. Cl.
CPC ....... *H04N 1/00307* (2013.01); *H04N 1/0049* (2013.01); *H04N 2201/0041* (2013.01);
(Continued)

(58) Field of Classification Search
CPC ............. H04N 1/00307; H04N 1/0049; H04N 2201/0041; H04N 2201/0055; H04N 2201/0072
See application file for complete search history.

(56) References Cited

U.S. PATENT DOCUMENTS

2017/0243087 A1* 8/2017 Awatsu .............. G06K 15/4065
2018/0165040 A1* 6/2018 Matsuda .............. H04B 17/318
2018/0255201 A1 9/2018 Sadakuni

FOREIGN PATENT DOCUMENTS

JP 5810766 B2 11/2015
JP 2015-215732 A 12/2015
(Continued)

OTHER PUBLICATIONS

Extended European Search Report dated Jun. 9, 2020 mailed in the corresponding European Patent Application No. 20152620.9.

*Primary Examiner* — Quang N Vo
(74) *Attorney, Agent, or Firm* — IP Business Solutions, LLC

(57) ABSTRACT

An image reading apparatus includes a manuscript reader, a communication device, a distance determination device, a manuscript leaving determination device, a controller, and an approaching person determination device. The manuscript leaving determination device determines whether a manuscript is left in the image reading apparatus. The communication device performs wireless communication with a portable device carried by a user. The approaching person determination device determines presence and absence of a person approaching the image reading apparatus. The controller transmits, to the portable device, warning information indicating a risk of information leakage when the distance determination device determines that a distance between the image reading device and the portable device has reached a predetermined first threshold value and the approaching person determination device determines that there is an approaching person in a state in which the manuscript leaving determination device has determined that a manuscript is left in the image reading apparatus.

11 Claims, 7 Drawing Sheets

(52) U.S. Cl.
CPC .............. *H04N 2201/0055* (2013.01); *H04N 2201/0072* (2013.01)

(56) References Cited

FOREIGN PATENT DOCUMENTS

| | | |
|---|---|---|
| JP | 2016-012778 A | 1/2016 |
| JP | 2017-146827 A | 8/2017 |

* cited by examiner

IMAGE READING APPARATUS AND IMAGE FORMING APPARATUS FOR WARNING OF RISK OF INFORMATION LEAKAGE

INCORPORATION BY REFERENCE

This application claims priority to Japanese Patent Application No. 2019-012335 filed on Jan. 28, 2019, the entire contents of which are incorporated by reference herein.

BACKGROUND

The present disclosure relates to an image reading apparatus and an image forming apparatus and, particularly, to a technology for preventing leakage of information from manuscripts and printed matters.

There is a general technology for outputting information indicating that a user has forgotten to pick up a printed matter to a portable device carried by the user when the distance between the portable device and a printer becomes equal to or greater than a predetermined threshold value before printing through the printer is completed. In this general technology, when a user exits a convenience store before printing through the printer installed in the convenience store is completed, for example, information indicating that the user has forgotten to pick up a printed matter is output to the portable device.

SUMMARY

As one aspect of the present disclosure, a technology enhanced from the aforementioned technology is proposed.

An image reading apparatus according to one aspect of the present disclosure includes a manuscript reader, a communication device and a control device. The manuscript reader reads a manuscript transferred by an automatic manuscript feeding device or a manuscript mounted on a manuscript mounting surface. The communication device performs wireless communication with a portable device carried by a user. The control device includes a processor and functions as a distance determination device, a manuscript leaving determination device, a controller, and an approaching person determination device by the processor executing a control program. The distance determination device determines whether a distance between the portable device and the image reading apparatus has reached a predetermined first threshold value and whether the distance has reached a predetermined second threshold value less than the first threshold value. The manuscript leaving determination device determines whether a manuscript read by the manuscript reader is left in the image reading apparatus using a state in which the distance determination device determines that the distance has reached the second threshold value as one condition. The controller transmits, to the portable device through the communication device, predetermined first warning information indicating that the user has forgotten to pick up the manuscript when the distance determination device determines that the distance has reached the first threshold value in a state in which the manuscript leaving determination device has determined that the manuscript is left in the image reading apparatus. The approaching person determination device determines presence and absence of a person approaching the image reading apparatus. The controller transmits, to the portable device through the communication device, predetermined second warning information indicating a risk of information leakage by another person when an approaching person determination device determines that there is the approaching person in a state in which the manuscript leaving determination device has determined that the manuscript is left in the image reading apparatus first. The controller does not transmit the second warning information to the portable device if the distance determination device determines that the distance has reached the first threshold value even when there is a person approaching the image reading apparatus in a state in which the manuscript leaving determination device has determined that the manuscript is left in the image reading apparatus first.

In addition, an image forming apparatus according to one aspect of the present disclosure includes an image forming device, a communication device, and a control device. The image forming device forms an image on recording paper. The communication device performs wireless communication with a portable device carried by a user. The control device includes a processor and functions as a distance determination device, a printed matter leaving determination device, a controller, and an approaching person determination device by the processor executing a control program. The distance determination device determines whether a distance between the portable device and the image forming apparatus has reached a predetermined first threshold value and whether the distance has reached a predetermined second threshold value less than the first threshold value. The printed matter leaving determination device determines whether a printed matter acquired by the image forming device forming an image on the recording paper is left in the image forming apparatus using a state in which the distance determination device determines that the distance has reached the second threshold value as one condition. The controller transmits, to the portable device through the communication device, predetermined third warning information indicating that the user has forgotten to pick up the printed matter when the distance determination device determines that the distance has reached the first threshold value in a state in which the printed matter leaving determination device has determined that the printed matter is left in the image forming apparatus. The approaching person determination device determines presence and absence of a person approaching the image forming apparatus. The controller transmits, to the portable device through the communication device, predetermined fourth warning information indicating a risk of information leakage by another person when the approaching person determination device determines that there is an approaching person in a state in which the printed matter leaving determination device has determined that the printed matter is left in the image forming apparatus first. The controller does not transmit the fourth warning information to the portable device if the distance determination device determines that the distance has reached the first threshold value even when there is a person approaching the image forming apparatus in a state in which the printed matter leaving determination device has determined that the printed matter is left in the image forming apparatus first.

DETAILED DESCRIPTION

Figure 1:
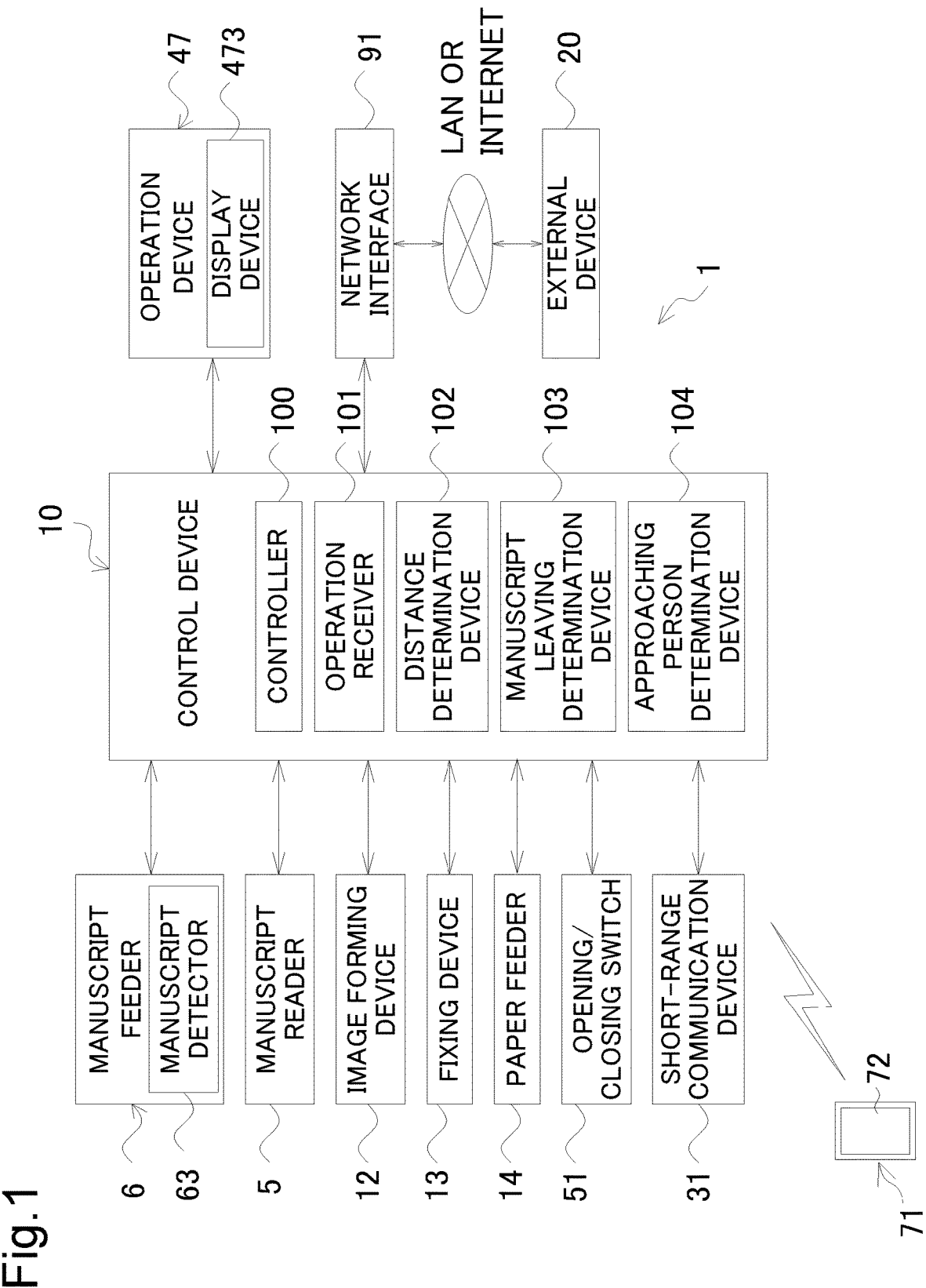
FIG. 1 is a functional block diagram schematically showing major internal components of an image forming apparatus including an image reading apparatus according to a first embodiment of the present disclosure.
Figure 2:
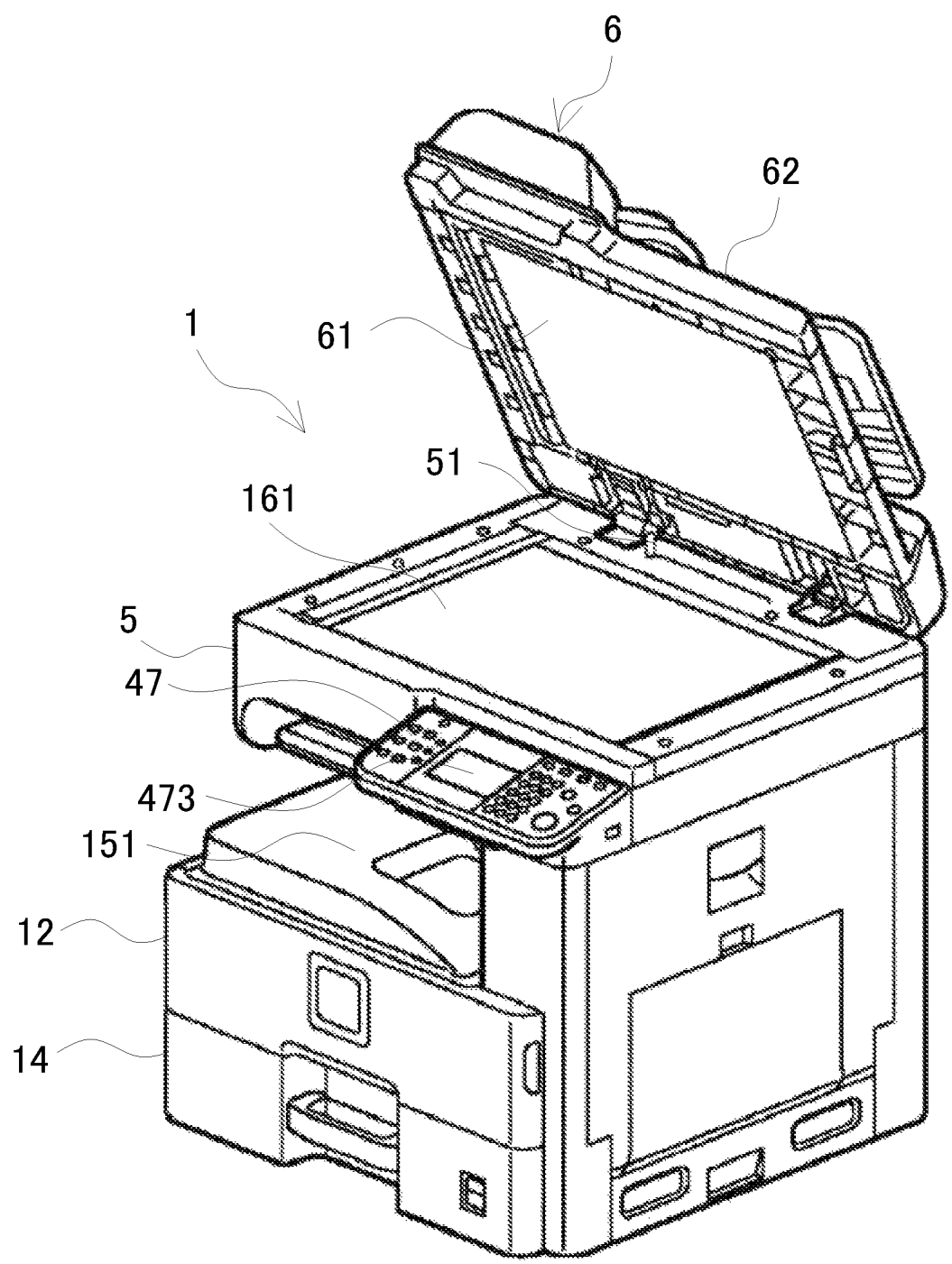
FIG. 2 is a perspective view showing the exterior of the image forming apparatus including the image reading apparatus according to the first embodiment.

Hereinafter, an image reading apparatus and an image forming apparatus according to an embodiment of the present disclosure will be described with reference to the drawings. FIG. 1 is a functional block diagram schematically showing major internal components of an image forming apparatus including an image reading apparatus according to a first embodiment of the present disclosure and FIG. 2 is a perspective view showing the exterior of the image forming apparatus including the image reading apparatus according to the first embodiment. Meanwhile, the image reading apparatus according to the first embodiment includes components of the image forming apparatus 1 except an image forming device 12 and a fixing device 13.

The image forming apparatus 1 is, for example, a multi-function machine which combines a plurality of functions such as a copy function, a printer function, a scan function and facsimile function. The image forming apparatus 1 includes a control device 10, a manuscript feeder 6, a manuscript reader 5, an image forming device 12, a fixing device 13, a paper feeder 14, an opening/closing switch 51, a short-range communication device 31, an operation device 47, and a network interface 91.

A case in which a manuscript reading operation is performed in the image forming apparatus 1 will be described. The manuscript reader 5, for example, includes a charge coupled device (CCD) as a scanner that optically reads a manuscript and generates image data representing an image of the manuscript. Specifically, the manuscript reader 5 optically reads the image of a manuscript transferred by the manuscript feeder 6 or a manuscript mounted on a contact glass 161 and then generates image data. The image data generated by the manuscript reader 5 is stored in an image memory or the like which is not illustrated. Meanwhile, the manuscript feeder 6 and the contact glass 161 are examples of an automatic manuscript feeding device and a manuscript mounting surface in the claims, respectively.

In addition, the manuscript feeder 6 is configured to be opened and closed using hinges or the like on the manuscript reader 5 and includes a manuscript mat 61 and a manuscript ejection tray 62. The manuscript mat 61 serves as a manuscript pressing cover when a manuscript mounted on the contact glass 161 is read. The manuscript ejection tray 62 loads manuscripts transferred by the manuscript feeder 6 and read by the manuscript reader 5. Further, the manuscript ejection tray 62 is provided with a manuscript detector 63 that detects whether a manuscript is present in the manuscript ejection tray 62.

The manuscript reader 5 is provided with the opening/closing switch 51 for detecting opening and closing of the manuscript mat 61. Meanwhile, the manuscript mat 61 and the opening/closing switch 51 are examples of a manuscript pressing member and an opening/closing detector in the claims, respectively.

A case in which an image forming operation is performed in the image forming apparatus 1 will be described. The image forming device 12 forms a toner image on recording paper fed from the paper feeder 14 on the basis of image data generated through the manuscript reading operation or image data received from a personal computer or the like as an external device 20 connected via a network. The image forming device 12 includes an image forming unit for magenta, an image forming unit for cyan, an image forming unit for yellow, an image forming unit for black, an intermediate transfer belt (image carrier), and a secondary transfer roller, all of which are not illustrated. Each of these image forming units includes a photosensitive drum, a developing device, a charging device, an exposure device, and a primary transfer roller.

The fixing device 13 heats and presses recording paper on which a toner image has been formed by the image forming device 12 using a fixing roller to fix the toner image on the recording paper, and the recording paper on which fixing processing has been performed is ejected to the ejection tray 151. The paper feeder 14 includes a paper feeding cassette.

The short-range communication device 31 performs wireless communication with a portable device 71 carried by a user using a short-range wireless communication method such as near field communication (NFC), Bluetooth (registered trademark), a wireless LAN, or the like.

The portable device 71 includes an interface for short-range communication such as NFC communication, an interface for wireless LAN communication, and a display device 72 and can acquire positional information thereof. For example, a smartphone is conceivable as the portable device 71.

The operation device 47 receives instructions such as an image forming operation execution instruction and the like from an operator with respect to various operations and processing which can be executed by the image forming apparatus 1. The operation device 47 includes a display device 473 that displays operation guidance and the like to the operator. The display device 473 has a touch panel function and thus the operator can operate the image forming apparatus 1 by touching a button or a key displayed on a screen.

The network interface 91 transmits/receives various types of data to/from the portable device 71 and an external device 20 such as a personal computer or a server in a local area or on the Internet. Meanwhile, the network interface 91 is an example of a communication device in the claims.

The control device 10 includes a processor, a random access memory (RAM), a read only memory (ROM), and a dedicated hardware circuit. The processor may be a central processing unit (CPU), an application specific integrated circuit (ASIC), a micro-processing unit (MPU), or the like, for example. The control device 10 includes a controller 100, an operation receiver 101, a distance determination device 102, a manuscript leaving determination device 103, and an approaching person determination device 104.

The control device 10 functions as the controller 100, the operation receiver 101, the distance determination device 102, the manuscript leaving determination device 103 and the approaching person determination device 104 through operations of the processor according to a control program stored in a hard disk drive (HDD) which is not illustrated. However, the controller 100 and the like may each be configured using hardware circuits without depending on operations of the control device 10 according to the control program. Hereinafter, the same applies to each embodiment unless otherwise mentioned.

The controller 100 controls the overall operation of the image forming apparatus 1. The controller 100 is connected to the manuscript feeder 6, the manuscript reader 5, the image forming device 12, the fixing device 13, the paper feeder 14, the opening/closing switch 51, the short-range communication device 31, the operation device 47, and the network interface 91 and controls operations of these components.

For example, the controller 100 may acquire personal information (e.g., an ID code or an IP address of the portable device 71) stored in the portable device 71 from the portable device 71 brought close to the short-range communication device 31 of the image forming apparatus 1 through NFC communication or the like.

The operation receiver 101 receives an operation input from a user through the operation device 47. For example, the operation receiver 101 may receive a user operation with respect to a hard key included in the operation device 47 and further receive a user operation with respect to an operation screen displayed on the display device 473 through the touch panel function of the display device 473.

For example, if the operation receiver 101 receives a user operation for starting copying, the controller 100 may transmit a command representing that positional information of the portable device 71 is regularly transmitted to the image forming apparatus 1 to the portable device 71 through the network interface 91. Accordingly, the image forming apparatus 1 can ascertain the position of the portable device 71.

The distance determination device 102 determines whether the distance D between the portable device 71 carried by the user and the image forming apparatus 1 has reached a predetermined first threshold value D1 (regarded as a distance at which the user has become far away from the image forming apparatus 1, for example, 10 m). Further, the distance determination device 102 calculates the distance D on the basis of positional information of the portable device 71 that is transmitted from the portable device 71 and positional information of the image forming apparatus 1 registered in advance.

Furthermore, the distance determination device 102 determines whether the distance D has reached a predetermined second threshold value D2 (regarded as a distance at which the user is close to the image forming apparatus 1, for example, 1 m) less than the first threshold value D1.

The manuscript leaving determination device 103 determines whether a manuscript read by the manuscript reader 5 is left in the image forming apparatus 1. For example, when the distance determination device 102 determines that the distance D has reached the second threshold value D2 in a state in which (i) opening of the manuscript mat 61 has not been detected by the opening/closing switch 51 or (ii) presence of a manuscript in the manuscript ejection tray 62 has been detected by the manuscript detector 63 after the manuscript reader 5 has read the manuscript mounted on the contact glass 161, the manuscript leaving determination device 103 may determine that the manuscript is left in the image forming apparatus 1 (here, on the contact glass 161).

In addition, when the distance determination device 102 determines that the distance D has reached the second threshold value D2 in a state in which presence of a manuscript in the manuscript ejection tray 62 has been detected by the manuscript detector 63 after the manuscript reader 5 has read the manuscript transferred by the manuscript feeder 6, the manuscript leaving determination device 103 determines that the manuscript is left in the image forming apparatus 1 (here, in the manuscript ejection tray 62).

The approaching person determination device 104 determines presence and absence of a person approaching the image forming apparatus 1. For example, the approaching person determination device 104 determines that there is a person approaching the image forming apparatus 1 when the opening/closing switch 51 detects opening of the manuscript mat 61. For example, the approaching person determination device 104 may determine that there is an approaching person when opening of the manuscript mat 61 is detected in a state in which the opening/closing switch 51 detects that opening of the manuscript mat 61 has not been detected. In addition, the approaching person determination device 104 determines that there is an approaching person when the operation receiver 101 receives a user operation. Furthermore, as another embodiment, the image forming apparatus 1 may newly include a human body detector 104A (e.g., a human body detection sensor that detects infrared rays emitted from the human body) that detects a person approaching the image forming apparatus 1, and when the human body detector 104A detects a person approaching the image forming apparatus 1, the approaching person determination device 104 may determine that there is a person approaching the image forming apparatus 1.

Figure 3A:
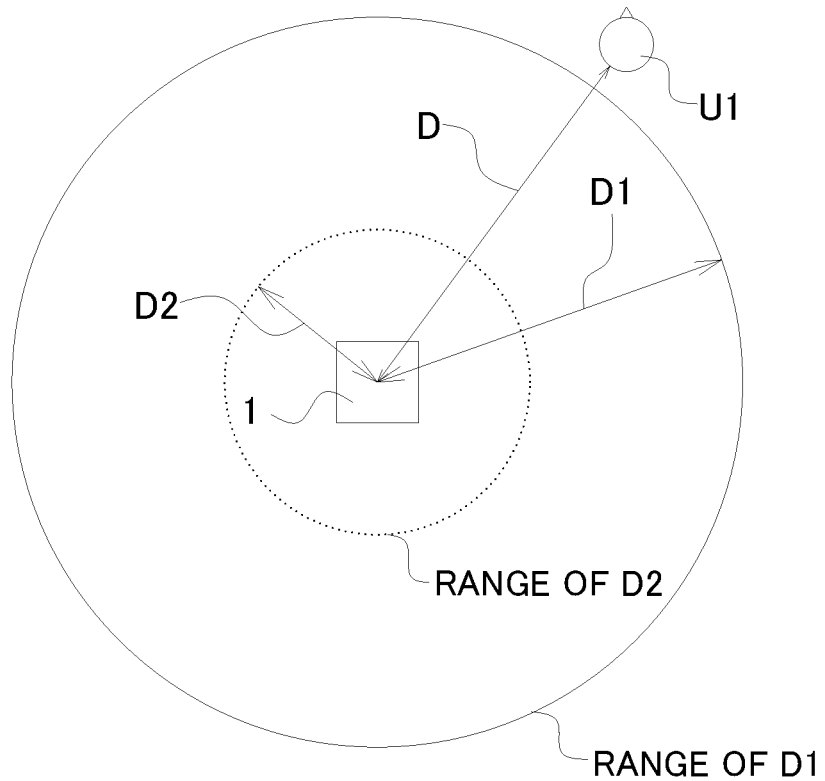
FIG. 3A and FIG. 3B are diagrams each showing a positional relationship between the image forming apparatus and a user carrying a portable device.
Figure 3B:
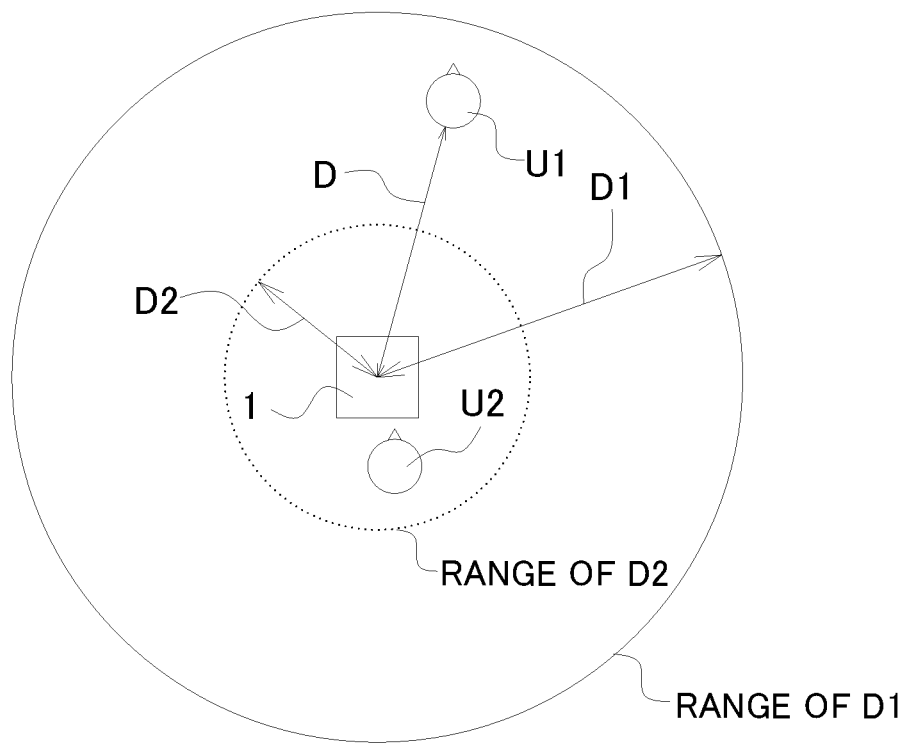
Figure 4:
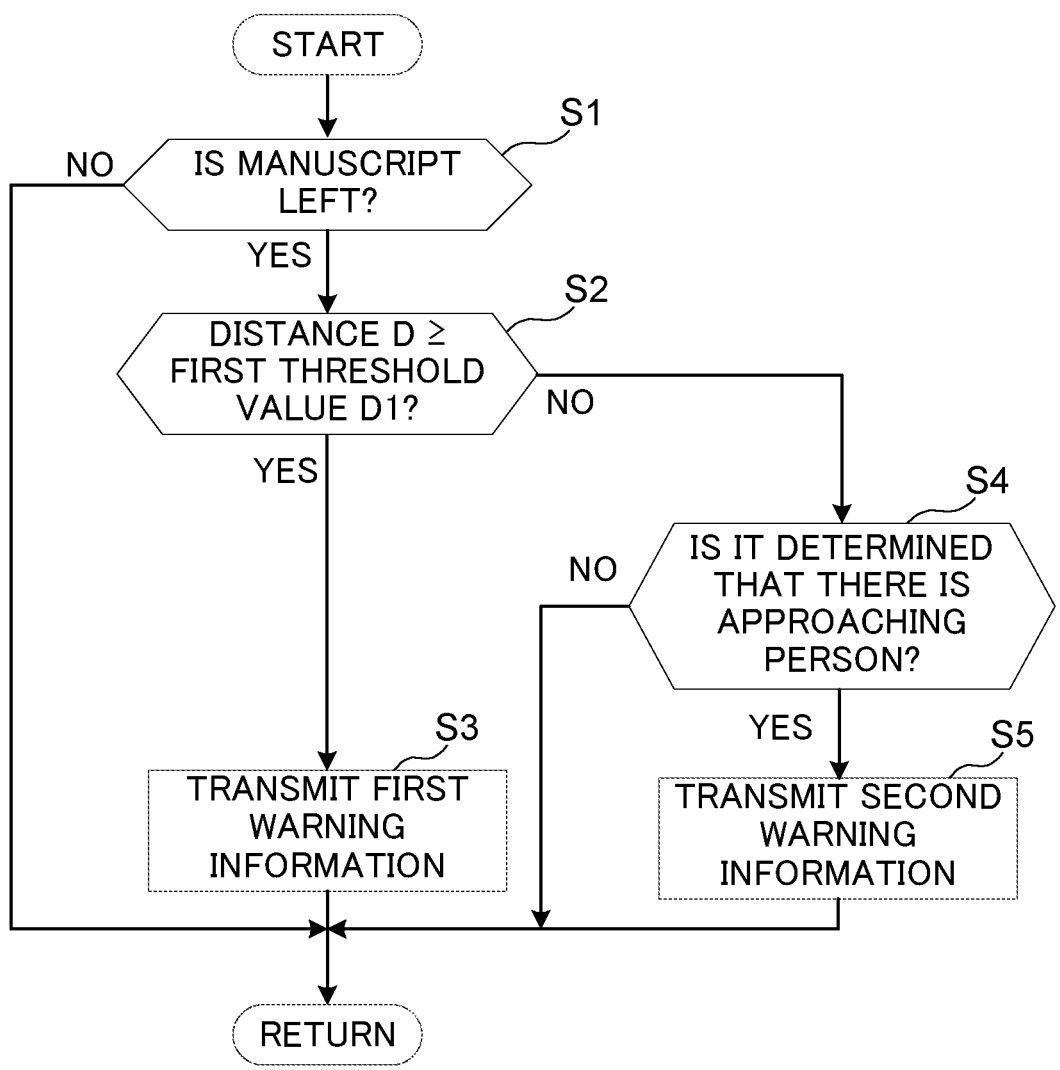
FIG. 4 is a flowchart showing processing of transmitting warning information from the image forming apparatus to the portable device.

Next, processing of transmitting warning information from the image forming apparatus 1 to the portable device 71 which is performed on the basis of a positional relationship between the image forming apparatus 1 and the user carrying the portable device 71 when the user forgets to pick up a manuscript will be described. FIG. 3A and FIG. 3B are diagrams each showing a positional relationship between the image forming apparatus 1 and the user carrying the portable device 71. FIG. 4 is a flowchart showing processing of transmitting warning information from the image forming apparatus 1 to the portable device 71.

As shown in FIG. 3A, when the distance determination device 102 determines that the distance D has reached the first threshold value D1 (YES in S2) in a state in which the manuscript leaving determination device 103 has determined that a manuscript is left in the image forming apparatus 1 (YES in S1), the controller 100 transmits predetermined first warning information indicating that the user has forgotten to pick up the manuscript to the portable device 71 corresponding to an IP address acquired in advance using the short-range communication device 31 through the network interface 91 (S3). For example, the first warning information having a message such as "The manuscript is still in the copy machine" may be transmitted to the portable device 71. On the other hand, the controller 100 does not perform processing after S2 when the manuscript leaving determination device 103 determines that no manuscript is left in the image forming apparatus 1 (NO in S1).

The portable device 71 includes an application having a function of displaying a message indicated by warning information transmitted from the image forming apparatus 1 on the display device 72. Accordingly, when a user U1 carrying the portable device 71 moves further away from the image forming apparatus 1 than the distance D (first threshold value D1) while a manuscript is left in the image forming apparatus 1, as shown in FIG. 3A, the aforementioned message is displayed on the display device 72 of the portable device 71.

As shown in FIG. 3B, when the distance determination device 102 determines that the distance D has not reached the first threshold value D1 (NO in S2) and the approaching person determination device 104 determines that there is an approaching person (YES in S4) in a state in which the manuscript leaving determination device 103 has determined that a manuscript is left in the image forming apparatus 1 (YES in S1), the controller 100 transmits predetermined second warning information indicating a risk of information leakage by another person to the portable device 71 corresponding to the aforementioned IP address through the network interface 91 because a third party other than the user is considered to have approached the image forming apparatus 1 (S5). For example, the second warning information having a message such as "You may have forgotten a copied or scanned manuscript in the copy machine and there is a chance that someone else could see it or take it" may be transmitted to the portable device 71. On the other hand, when the approaching person determination device 104 determines that there is no approaching person in S4 (NO in S4), the controller 100 does not transmit the second warning information to the portable device 71.

Accordingly, when a third party U2 other than the user U1 has approached the image forming apparatus 1 while a manuscript is left in the image forming apparatus 1, as shown in FIG. 3B, the aforementioned message is displayed on the display device 72 of the portable device 71 even if the user U1 carrying the portable device 71 has not moved further away from the image forming apparatus 1 than the distance D (first threshold value D1).

According to the above-described first embodiment, when the distance D between the portable device 71 carried by the user and the image forming apparatus 1 has reached the first threshold value D1 (e.g., when the user exits a convenience store in which the copy machine is installed) while a manuscript is left, the first warning information indicating that the user has forgotten to pick up the manuscript is transmitted to the portable device 71. Accordingly, it is possible to remind the user that he or she has forgotten to pick up the manuscript when the user moves far away from the copy machine or the like, such as when the user exits the convenience store.

However, when the user leaves the copy machine during copying, a manuscript or a printed matter is at risk of being seen or taken by a third party other than the user. Since a manuscript or a printed matter may include information that the user wants to conceal, such as personal information, if the manuscript or printed matter is seen or taken by a third party, this may cause information leakage and a security problem.

In the general technology described in the related art, warning a user that he or she has forgotten to pick up a manuscript or a printed matter when the user exits a convenience store is effective to prevent the user from forgetting to pick up the manuscript or printed matter, but warning is not performed when the user remains in the convenience store even though the user leaves a copy machine or a printer, causing a security problem.

In contrast, the present embodiment can prevent a manuscript or a printed matter left in a copy machine or the like from being seen or taken by a third party and decrease a risk of information leakage more reliably than general apparatuses.

In addition, when a third party other than the user has approached the image forming apparatus 1 in a state in which a manuscript is left (i.e., when there is a high risk of information leakage by another person), the second warning information indicating a risk of information leakage is transmitted to the portable device 71. That is, when a risk of information leakage by another person is high even though the user has not moved far away from the copy machine or the like (e.g., the user does not exit the convenience store), the second warning information is transmitted to the portable device 71. Accordingly, it is possible to reduce a risk of information leakage by another person.

Figure 5:
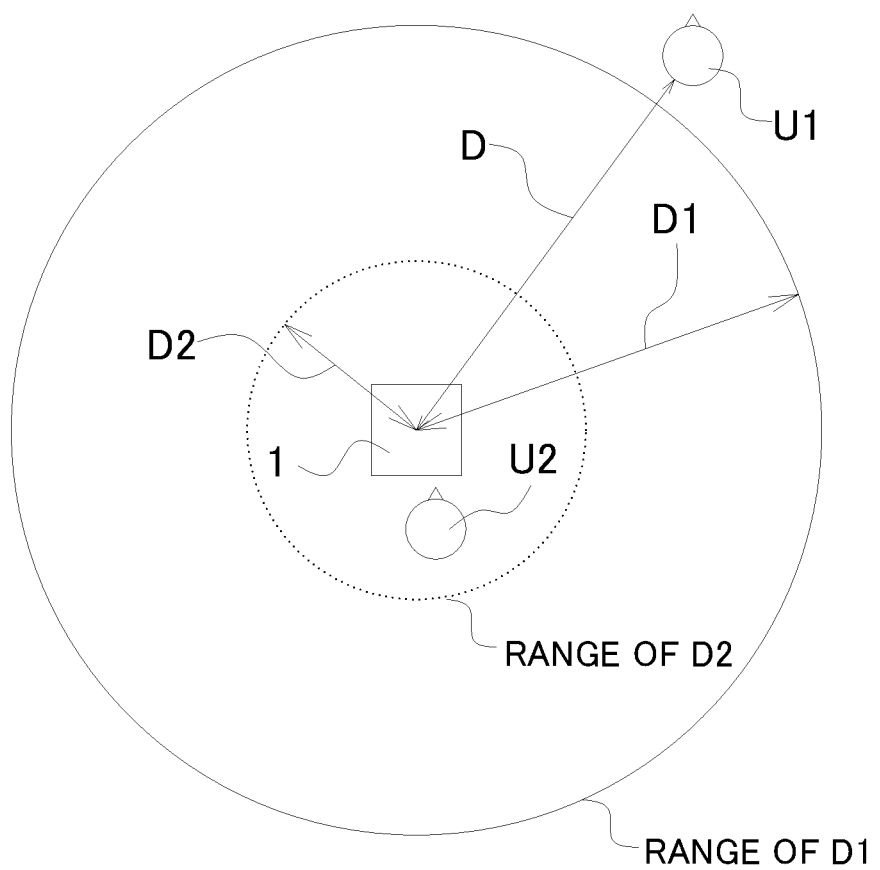
FIG. 5 is a diagram showing a positional relationship between the image forming apparatus and a user carrying a portable device.

Furthermore, according to the above-described first embodiment, when the user U1 carrying the portable device 71 has moved further away from the image forming apparatus 1 than the distance D (first threshold value D1) (refer to FIG. 5), the controller 100 transmits the first warning information to the portable device 71 irrespective of presence of a person approaching the image forming apparatus 1 at that time. That is, when the user U1 carrying the portable device 71 has moved further away from the image forming apparatus 1 than the distance D (first threshold value D1), it is conceived that the effect of newly transmitting the second warning information to the portable device 71 is insignificant because the first warning information has already been transmitted to the portable device 71, and when the user is notified that a third party other than the user has approached the image forming apparatus 1, it is considered difficult for the user to cope with it.

Accordingly, when the distance determination device 102 determines that the distance D has reached the first threshold value D1 in a state in which the manuscript leaving determination device 103 has determined that a manuscript is left in the image forming apparatus 1, the controller 100 does not transmit the second warning information to the portable device 71 even if the approaching person determination device 104 determines that there is an approaching person.

Figure 6:
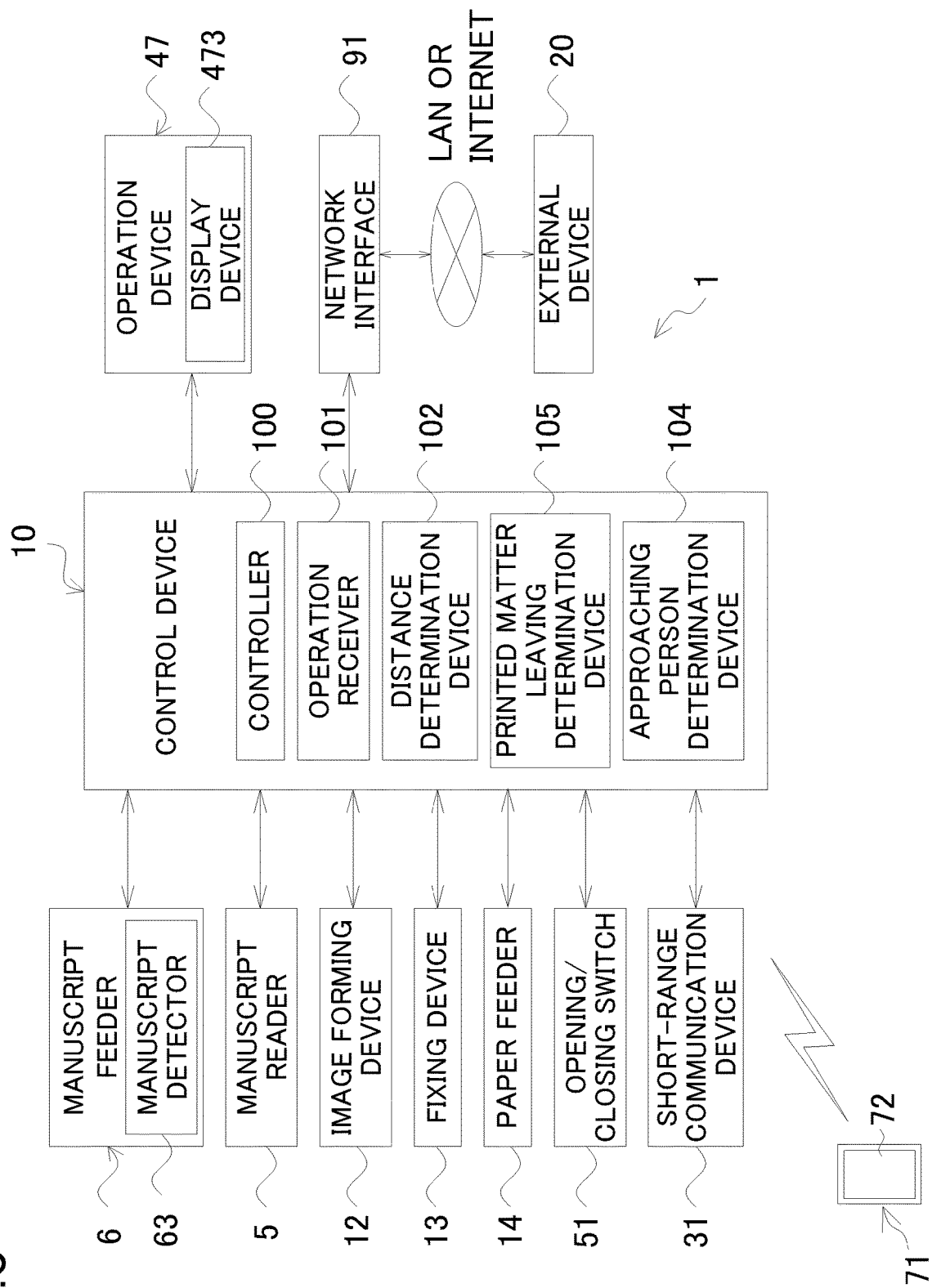
FIG. 6 is a functional block diagram schematically showing major internal components of an image forming apparatus according to a second embodiment.
Figure 7:
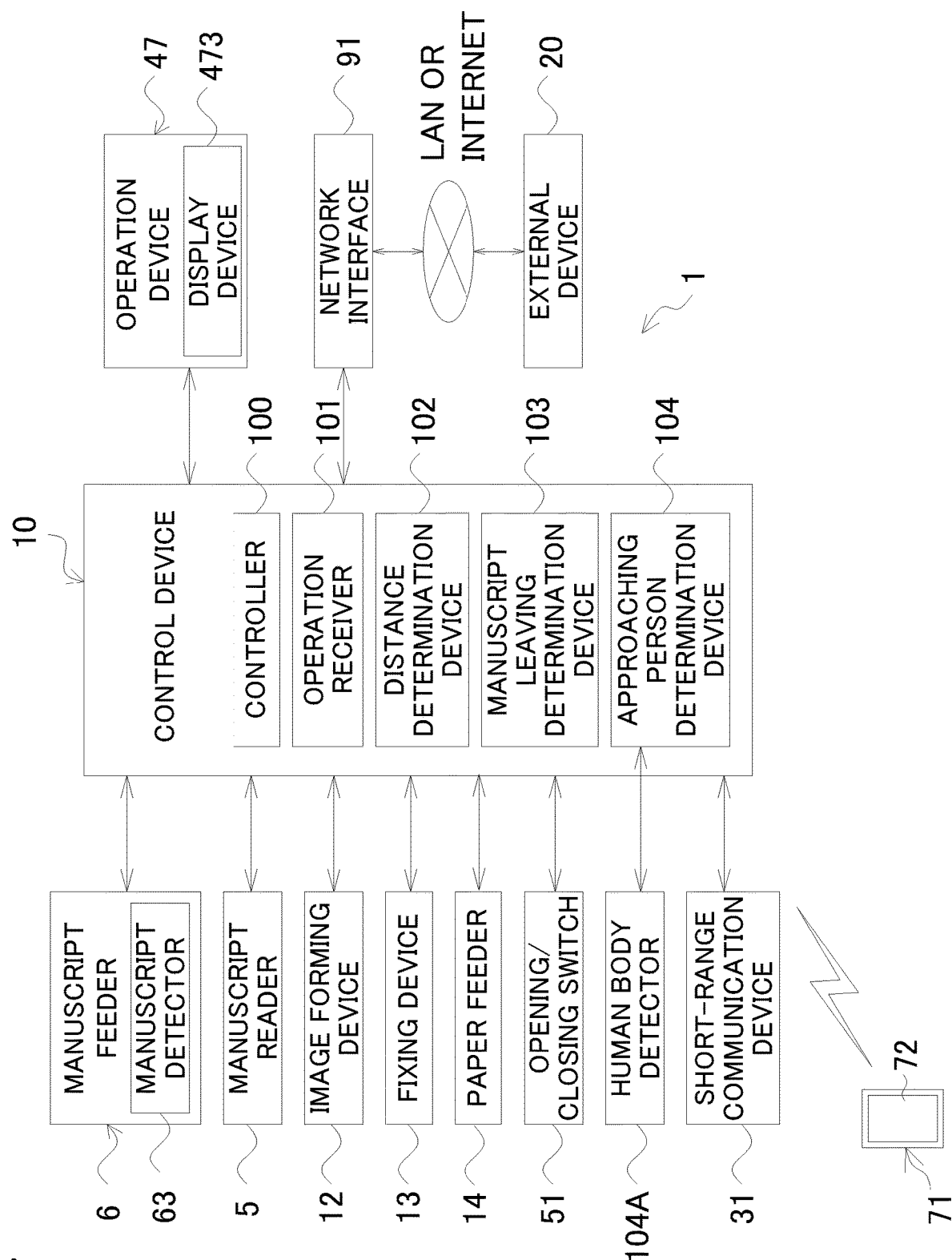
FIG. 7 is a functional block diagram schematically showing major internal components of an image forming apparatus according to another embodiment.

Further, although a case in which information leakage with respect to a manuscript is prevented is exemplified in the above description, in a second embodiment, information leakage from a printed matter may be prevented by including a printed matter leaving determination device 105 that determines whether a printed matter acquired by the image forming device 12 forming an image on recording paper is left in the image forming apparatus 1 instead of the manuscript leaving determination device 103 in the control device 10, as shown in FIG. 6.

For example, a printed matter detection sensor may be provided in the ejection tray 151 and the printed matter leaving determination device 105 may determine that a printed matter is left in the image forming apparatus 1 (here, on the ejection tray 151) when the distance determination device 102 determines that the distance D has reached the second threshold value D2 in a state in which the printed matter detection sensor detects presence of the printed matter on the ejection tray 151 after the image forming device 12 starts image formation on recording paper.

When the distance determination device 102 determines that the distance D has reached the first threshold value D1 in a state in which the printed matter leaving determination device 105 has determined that a printed matter is left in the image forming apparatus 1, the controller 100 transmits predetermined third warning information (corresponding to the first warning information) indicating that the user has forgotten to pick up the printed matter to the portable device 71 through the network interface 91.

Further, when the approaching person determination device 104 determines that there is an approaching person in a state in which the printed matter leaving determination device 105 has determined that a printed matter is left in the image forming apparatus 1, this means that a third party other than the user has approached the image forming apparatus 1 and thus the controller 100 transmits predetermined fourth warning information (corresponding to the second warning information) indicating a risk of information leakage by another person to the portable device 71 through the network interface 91.

In addition, when the distance determination device 102 determines that the distance D has reached the first threshold value D1 in a state in which the printed matter leaving determination device 105 has determined that no printed matter is left in the image forming apparatus 1, the controller 100 does not transmit the fourth warning information (corresponding to the second warning information) to the portable device 71 even if the approaching person determination device 104 determines that there is an approaching person.

Therefore, according to the above-described first and second embodiments, it is possible to prevent a manuscript or a printed matter left in the image forming apparatus 1 from being seen or taken by a third party and decrease a risk of information leakage by another person more reliably than general apparatuses.

In detail, according to the above-described first and second embodiments, when the distance between a portable device carried by a user and the image reading apparatus or the image forming apparatus has reached the first threshold value (for example, when the user exits a convenience store in which a copy machine is installed) in a state in which a manuscript or a printed matter is left, warning information indicating that the user has forgotten to pick up the manuscript or printed matter is transmitted to the portable device. Accordingly, it is possible to remind the user that he or she has forgotten to pick up the manuscript or printed matter when the user moves far away from the copy machine or the like, such as a case in which the user exits the convenience store.

Furthermore, when a third party other than the user has approached the image reading apparatus or the image forming apparatus in a state in which a manuscript or a printed matter is left (i.e., when a risk of information leakage is high), warning information indicating a risk of information leakage is transmitted to the aforementioned portable device. That is, when a risk of information leakage by another person increases even if the user is not far away from the copy machine (for example, the user does not exit the convenience store), the warning information is transmitted to the portable device. Accordingly, a risk of information leakage can be decreased.

The present disclosure is not limited to the above-described embodiments and can be modified in various manners. Furthermore, although a multifunction machine is used as an embodiment of the image reading apparatus and the image forming apparatus according to the present disclosure in the above-described embodiments, the multifunction machine is merely an example and other image reading apparatuses and image forming apparatuses having a copy function, a printer function and a scan function may be used.

Moreover, the configurations and processing represented in the above-described embodiments using FIG. 1 to FIG. 7 are merely embodiments of the present disclosure and the present disclosure is not limited thereto.

While the present disclosure has been described in detail with reference to embodiments thereof, it would be apparent to those skilled in the art the various changes and modifications may be made therein within the scope defined by the appended claims.

What is claimed is:

1. An image reading apparatus comprising:
    a manuscript reader that reads a manuscript transferred by an automatic manuscript feeding device or a manuscript mounted on a manuscript mounting surface;
    a communication device that performs wireless communication with a portable device carried by a user; and
    a control device that includes a processor and functions as, by the processor executing a control program:
        a distance determination device that determines whether a distance between the portable device and the image reading apparatus has reached a predetermined first threshold value and whether the distance has reached a predetermined second threshold value less than the first threshold value;
        a manuscript leaving determination device that determines whether a manuscript read by the manuscript reader is left in the image reading apparatus using a state in which the distance determination device determines that the distance has reached the second threshold value as one condition;
        a controller that transmits, to the portable device through the communication device, predetermined first warning information indicating that the user has forgotten to pick up the manuscript when the distance determination device determines that the distance has reached the first threshold value in a state in which the manuscript leaving determination device has determined that the manuscript is left in the image reading apparatus; and
        an approaching person determination device that determines presence and absence of a person approaching the image reading apparatus,
    wherein the controller transmits, to the portable device through the communication device, predetermined second warning information indicating a risk of information leakage by another person when the approaching person determination device determines that there is an approaching person in a state in which the manuscript leaving determination device has determined that the manuscript is left in the image reading apparatus first, and
    the controller does not transmit the second warning information to the portable device if the distance determination device determines that the distance has reached the first threshold value even when there is a person approaching the image reading apparatus in a state in which the manuscript leaving determination device has determined that the manuscript is left in the image reading apparatus first.

2. The image reading apparatus according to claim 1, wherein the distance determination device calculates the distance on a basis of positional information of the portable device transmitted from the portable device through the communication device and positional information of the image reading apparatus registered in advance.

3. The image reading apparatus according to claim 1, further comprising:
    a manuscript pressing member being openable/closable and that presses a manuscript mounted on the manuscript mounting surface; and
    an opening/closing detector that detects opening/closing of the manuscript pressing member,
    wherein, when the distance determination device determines that the distance has reached the second threshold value while the opening/closing detector does not detect opening of the manuscript pressing member after the manuscript reader reads a manuscript mounted on the manuscript mounting surface, the manuscript leaving determination device determines that the manuscript is left in the image reading apparatus.

4. The image reading apparatus according to claim 3, wherein the approaching person determination device determines that there is the approaching person when opening of the manuscript pressing member is detected in a state in which the opening/closing detector detects that opening of the manuscript pressing member has not been detected.

5. The image reading apparatus according to claim 1, further comprising:
a manuscript ejection tray in which a manuscript transferred by the automatic manuscript feeding device and read by the manuscript reader is loaded; and
a manuscript detector that detects presence and absence of a manuscript in the manuscript ejection tray,
wherein, when the distance determination device determines that the distance has reached the second threshold value in a state in which the manuscript detector has detected presence of a manuscript in the manuscript ejection tray after the manuscript reader has read the manuscript transferred by the automatic manuscript feeding device, the manuscript leaving determination device determines that the manuscript is left in the image reading apparatus.

6. The image reading apparatus according to claim 5, further comprising:
a manuscript pressing member being openable/closable and that presses a manuscript mounted on the manuscript mounting surface; and
an opening/closing detector that detects opening/closing of the manuscript pressing member,
wherein the approaching person determination device determines that there is an approaching person when opening of the manuscript pressing member is detected in a state in which the opening/closing detector detects that opening of the manuscript pressing member has not been detected.

7. The image reading apparatus according to claim 1, further comprising a human body detector that detects a person approaching the image reading apparatus,
wherein, when the human body detector detects a person approaching the image reading apparatus, the approaching person determination device determines that there is an approaching person.

8. The image reading apparatus according to claim 1, wherein the control device further functions as, by the processor executing the control program, an operation receiver that receives an operation input from a user,
wherein the approaching person determination device determines that there is an approaching person when the operation receiver receives a user operation.

9. The image reading apparatus according to claim 1, further comprising a short-range communication device that performs wireless communication with the portable device,
wherein the controller acquires in advance an IP address stored in the portable device from the portable device brought close to the short-range communication device through wireless communication and transmits the first warning information to the portable device corresponding to the IP address.

10. An image forming apparatus comprising:
the image reading apparatus according to claim 1; and
an image forming device that forms an image on recording paper on a basis of image data of a manuscript acquired through reading by the manuscript reader.

11. An image forming apparatus comprising:
an image forming device that forms an image on recording paper;
a communication device that performs wireless communication with a portable device carried by a user; and
a control device that includes a processor and functions as, by the processor executing a control program:
a distance determination device that determines whether a distance between the portable device and the image forming apparatus has reached a predetermined first threshold value and whether the distance has reached a predetermined second threshold value less than the first threshold value;
a printed matter leaving determination device that determines whether a printed matter acquired by the image forming device forming an image on the recording paper is left in the image forming apparatus using a state in which the distance determination device determines that the distance has reached the second threshold value as one condition;
a controller that transmits, to the portable device through the communication device, predetermined third warning information indicating that the user has forgotten to pick up the printed matter when the distance determination device determines that the distance has reached the first threshold value in a state in which the printed matter leaving determination device has determined that the printed matter is left in the image forming apparatus; and
an approaching person determination device that determines presence and absence of a person approaching the image forming apparatus,
wherein the controller transmits, to the portable device through the communication device, predetermined fourth warning information indicating a risk of information leakage by another person when the approaching person determination device determines that there is an approaching person in a state in which the printed matter leaving determination device has determined that the printed matter is left in the image forming apparatus first, and
the controller does not transmit the fourth warning information to the portable device if the distance determination device determines that the distance has reached the first threshold value even when there is a person approaching the image forming apparatus in a state in which the printed matter leaving determination device has determined that the printed matter is left in the image forming apparatus first.

\* \* \* \* \*